(12) United States Patent
Harris

(10) Patent No.: US 8,831,878 B2
(45) Date of Patent: Sep. 9, 2014

(54) GROUND LOCATION OF WORK TRUCK

(75) Inventor: Christopher Harris, Fishers, IN (US)

(73) Assignee: Systec Conveyors, Inc., Indianapolis, IN (US)

( * ) Notice: Subject to any disclaimer, the term of this patent is extended or adjusted under 35 U.S.C. 154(b) by 409 days.

(21) Appl. No.: 13/231,793

(22) Filed: Sep. 13, 2011

(65) Prior Publication Data

US 2012/0065880 A1    Mar. 15, 2012

Related U.S. Application Data

(60) Provisional application No. 61/382,174, filed on Sep. 13, 2010.

(51) Int. Cl.
*G08B 21/00*     (2006.01)
*G01C 21/20*     (2006.01)
*G01S 1/70*     (2006.01)

(52) U.S. Cl.
CPC ............. *G01C 21/206* (2013.01); *G01S 1/70* (2013.01)
USPC ........................................................ 701/454

(58) Field of Classification Search
USPC .......... 701/258, 259, 254, 28, 408, 514, 519, 701/523; 348/113, 116, 118, 119, 120, 164; 382/103, 104, 106, 153; 700/213, 214
See application file for complete search history.

(56) References Cited

U.S. PATENT DOCUMENTS

| | | | |
|---|---|---|---|
| 4,940,925 A * | 7/1990 | Wand et al. | 318/587 |
| 5,260,694 A * | 11/1993 | Remahl | 340/674 |
| 7,151,979 B2 | 12/2006 | Andersen et al. | |
| 7,394,380 B2 | 7/2008 | Ballin et al. | |
| 7,613,617 B2 | 11/2009 | Williams et al. | |
| 2008/0193009 A1* | 8/2008 | Sonoura | 382/153 |

* cited by examiner

*Primary Examiner* — Khoi Tran
*Assistant Examiner* — Adam Mott
(74) *Attorney, Agent, or Firm* — Maginot, Moore & Beck, LLP

(57) ABSTRACT

A vehicle tracking system tracks the position of at least one vehicle and displays the tracked position. The system includes a plurality of beacons, at least one provided on each vehicle, configured to emit a corresponding identifying signal. A camera is configured to generate image data including region data based on a region in which the vehicles may be located, and beacon data based on the identifying signals corresponding to the beacons located in the region. A controller is configured to process the beacon data to generate position data based on a corresponding position of the beacons located in the region and to generate identification data, which corresponds to each of the identifying signals emitted by the beacons located in the region. Also, the controller outputs at least one of the image data, the position data, and the identification data to the monitor.

15 Claims, 5 Drawing Sheets

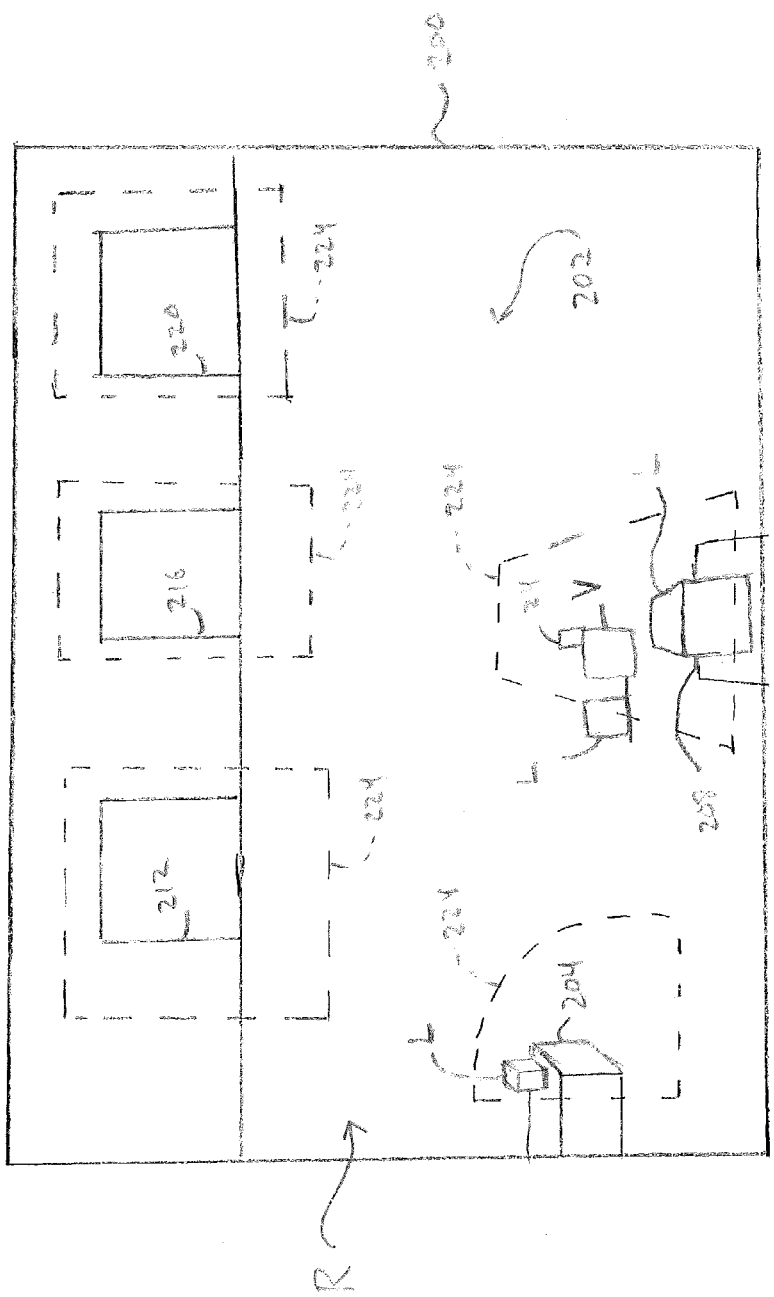

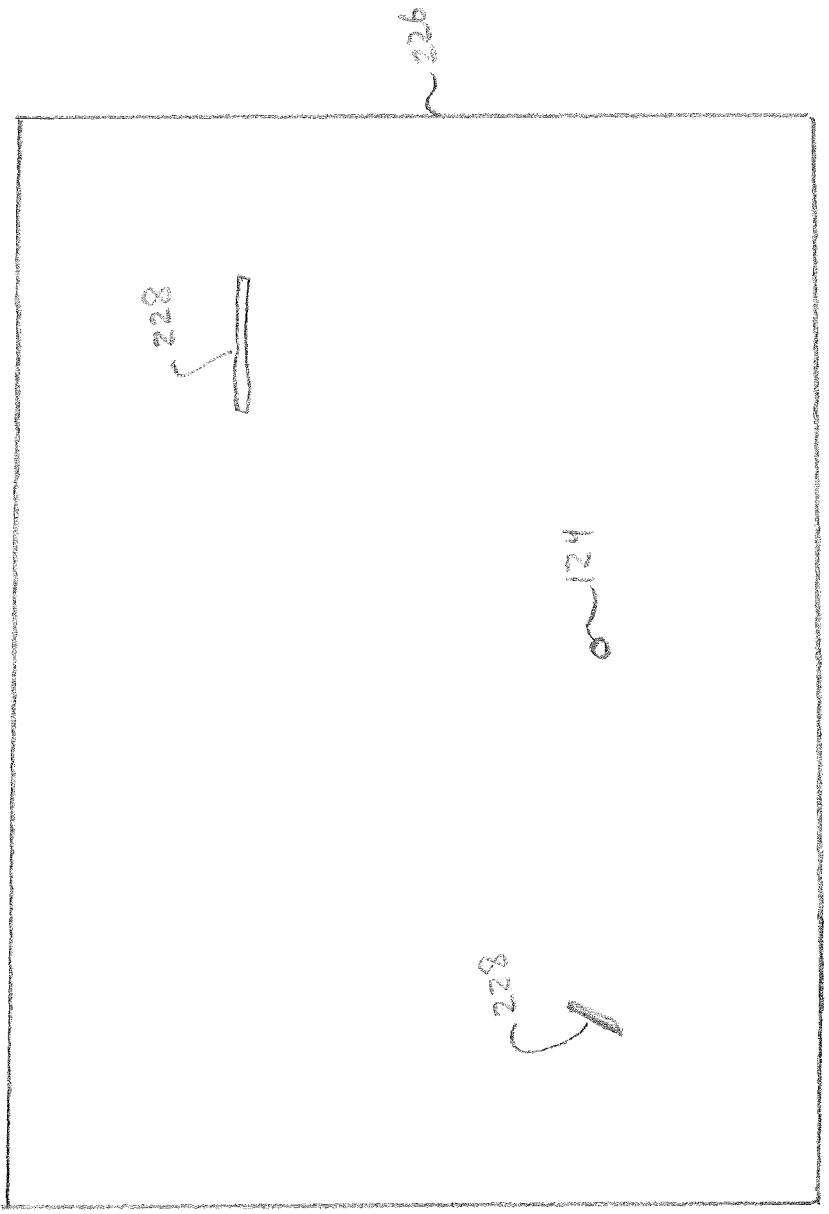

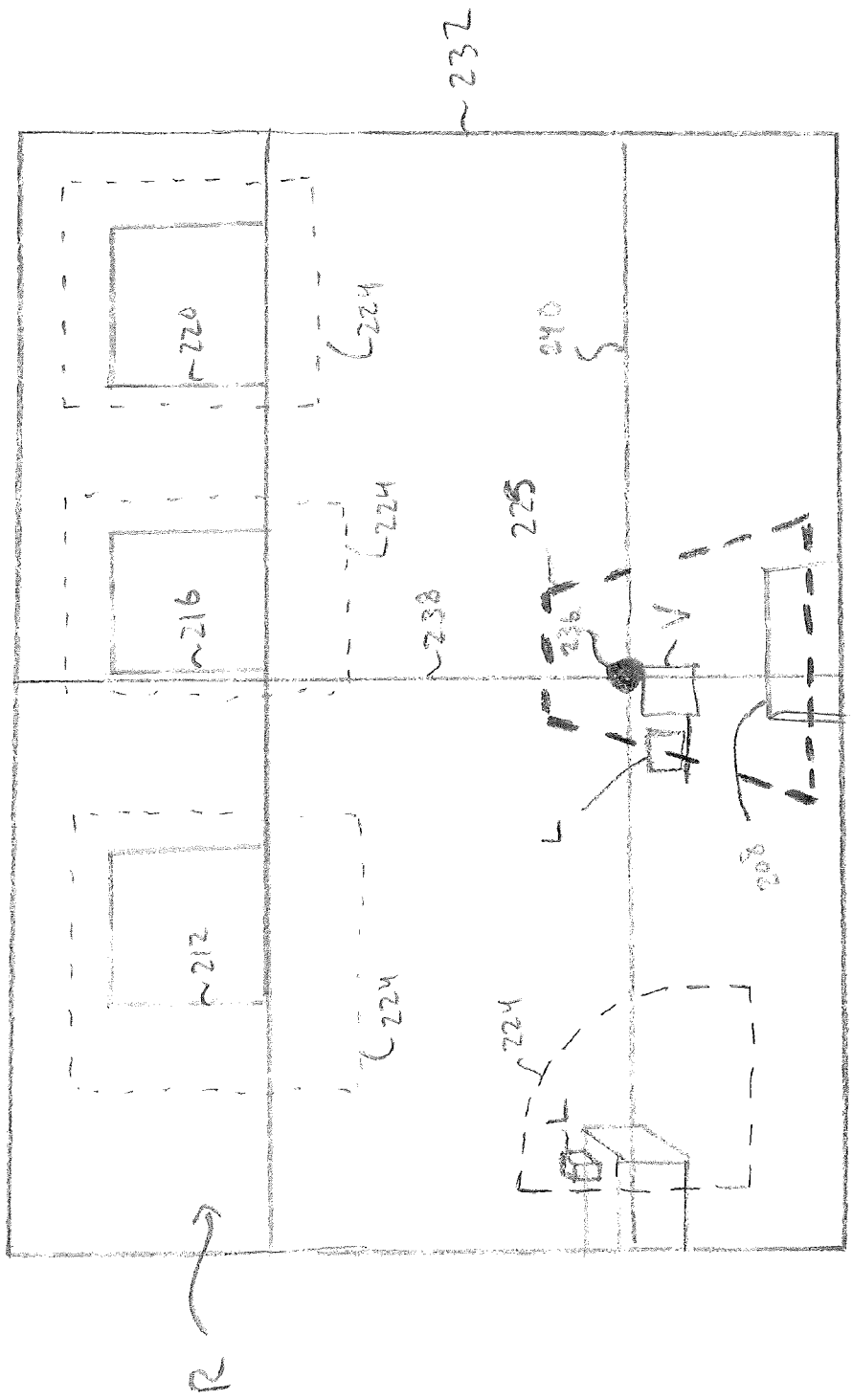

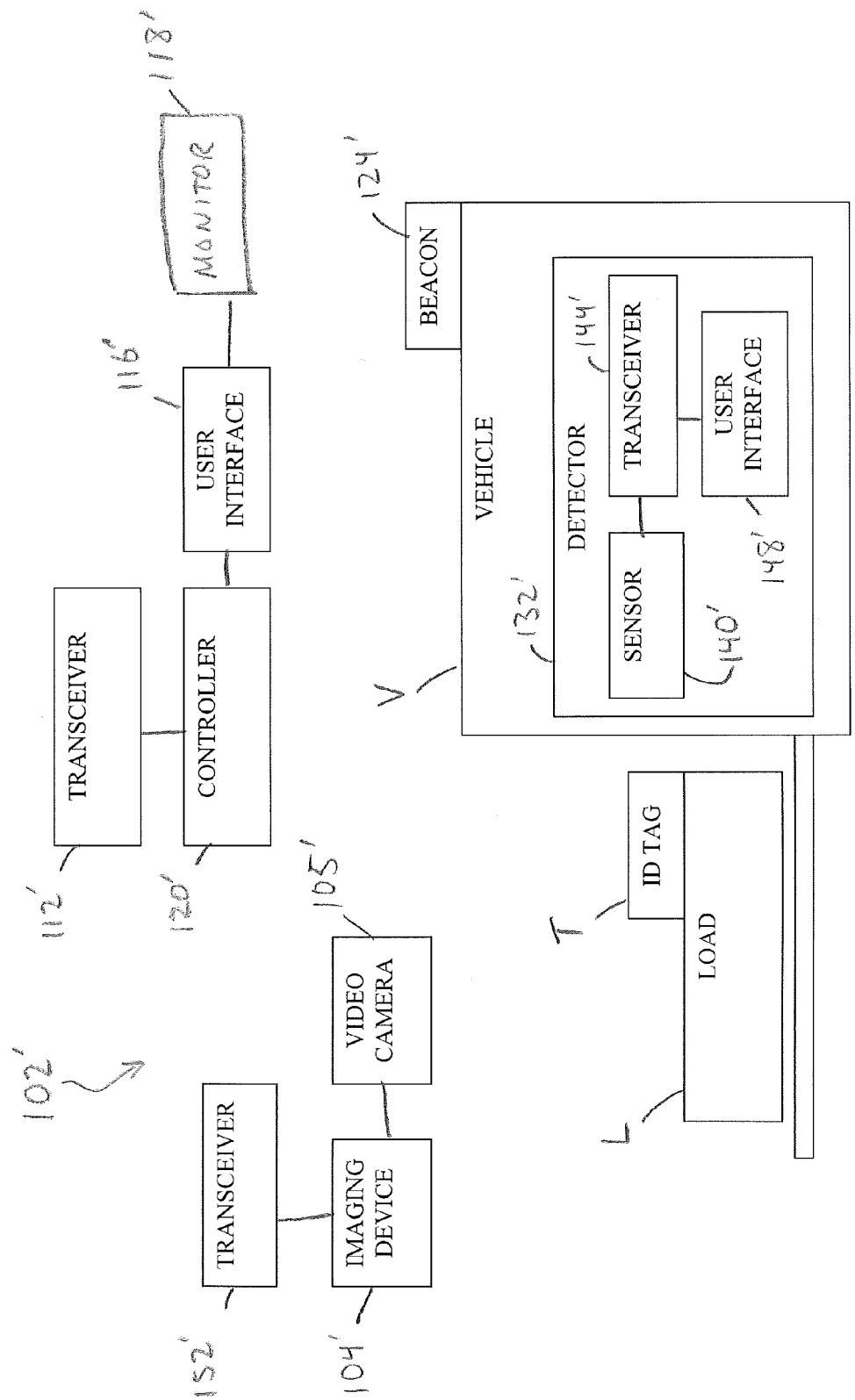

GROUND LOCATION OF WORK TRUCK

This application is a utility application claiming priority of U.S. provisional application Ser. No. 61/382,174, filed Sep. 13, 2010, entitled "Ground Location of Work Truck," the disclosure of which is incorporated by reference herein in its entirety.

BACKGROUND

The present disclosure relates to the field of electronic tracking and identification and especially to the tracking and identification of load moving devices, such as forklifts or other vehicles.

In an exemplary production facility, a conveyer system transports loads of product or other items, referred to simply as loads, to a receiving region. Equipment operators use forklifts, or other vehicles, to move each load from the receiving region to one or more loading docks of a distribution region of the production facility. A tractor-trailer or other load hauler may be positioned at each loading dock to receive the loads from the forklifts.

The floor of a busy production facility typically becomes heavily trafficked with forklifts and equipment operators. Accordingly, one or more supervisors may be tasked with monitoring the production facility to ensure that the equipment operators move each load to the correct loading dock. If the production facility is sufficiently small, a single supervisor may track the forklifts and the loads from the floor of the production facility. A large production facility, however, may require multiple supervisors and/or assistants. Of course, the cost of additional personnel may be prohibitively expensive for some organizations.

To reduce the cost of tracking load moving devices within a production facility, one or more video cameras may be positioned in view of at least the receiving region and the distribution region of the production facility. The cameras are typically connected to one or more video screens, which may be monitored from a location remote from the floor of the production facility by a single person. The camera system generally increases the field of view over that of a person standing on the facility floor, in the nature of a typical surveillance camera.

The camera system, however, does not enable a viewer of the monitor(s) to easily identify a particular forklift being utilized by an equipment operator. This is because, as viewed on the monitors, each forklift may appear virtually identical to each other forklift on the production floor. Accordingly, further developments in the field of electronic tracking and identification of load moving vehicles are desirable.

SUMMARY

According to one embodiment of the present disclosure, a vehicle tracking system is used to track the position of at least one vehicle and to output the tracked position of the at least one vehicle on a display monitor. The vehicle tracking system includes a plurality of beacons, a camera, and a controller. Each of the plurality of beacons is configured to emit a corresponding identifying signal, and at least one of the beacons is provided on each of the vehicles. The camera is configured to generate image data including region data and beacon data. The region data is based on a region in which the vehicles may be located, and the beacon data is based on the identifying signals corresponding to the beacons located in the region. The controller is configured to process the image data in order to at least partially isolate the beacon data from the region data. The controller also processes the isolated beacon data to generate position data, which is based on a corresponding position of the beacons located in the region. In addition, the controller processes the isolated beacon data to generate identification data, which corresponds to each of the identifying signals emitted by the beacons located in the region. Also, the controller outputs at least one of the image data, the position data, and the identification data to the monitor so that the tracked positioned of the vehicle is viewable to a user of the system.

According to another embodiment of the present disclosure, a vehicle tracking system is provided for tracking a plurality of vehicles within a region. Each of the vehicles is associated with a corresponding load. The vehicle tracking system includes a plurality of beacons, a camera, and a controller. Each beacon of the plurality beacons is configured to emit a corresponding identifying signal and at least one of said beacons is provided on each of the vehicles. Each detector of the plurality of detectors is provided on a corresponding one of the vehicles, and each of the detectors is configured to detect the load associated with the vehicle and to emit a corresponding load identifying signal based on said load. The camera is configured to generate image data, which includes region data representative of the region in which the vehicles may be located and beacon position data representative of a corresponding position of said beacons located in said region. The controller is configured to (i) receive load identifying signals, (ii) to generate load position data by associating each of said load identifying signals with said beacon position data, and (iii) to output at least one of said image data and said load position data to a monitor.

BRIEF DESCRIPTION OF THE FIGURES

FIG. 2 illustrates a screenshot generated by the system of FIG. 1, the screenshot shows a perspective view of a portion of a production facility, five virtual zones are overlaid upon the screenshot.

FIG. 3 illustrates a filtered view of the screenshot of FIG. 2.

FIG. 4 illustrates the screenshot of FIG. 2, having been modified to show the detected position of the beacon.

FIG. 5 depicts a block diagram of an alternative embodiment of a system configured to determine the position of a vehicle and to identify a load being carried by the vehicle.

DETAILED DESCRIPTION

Figure 1:
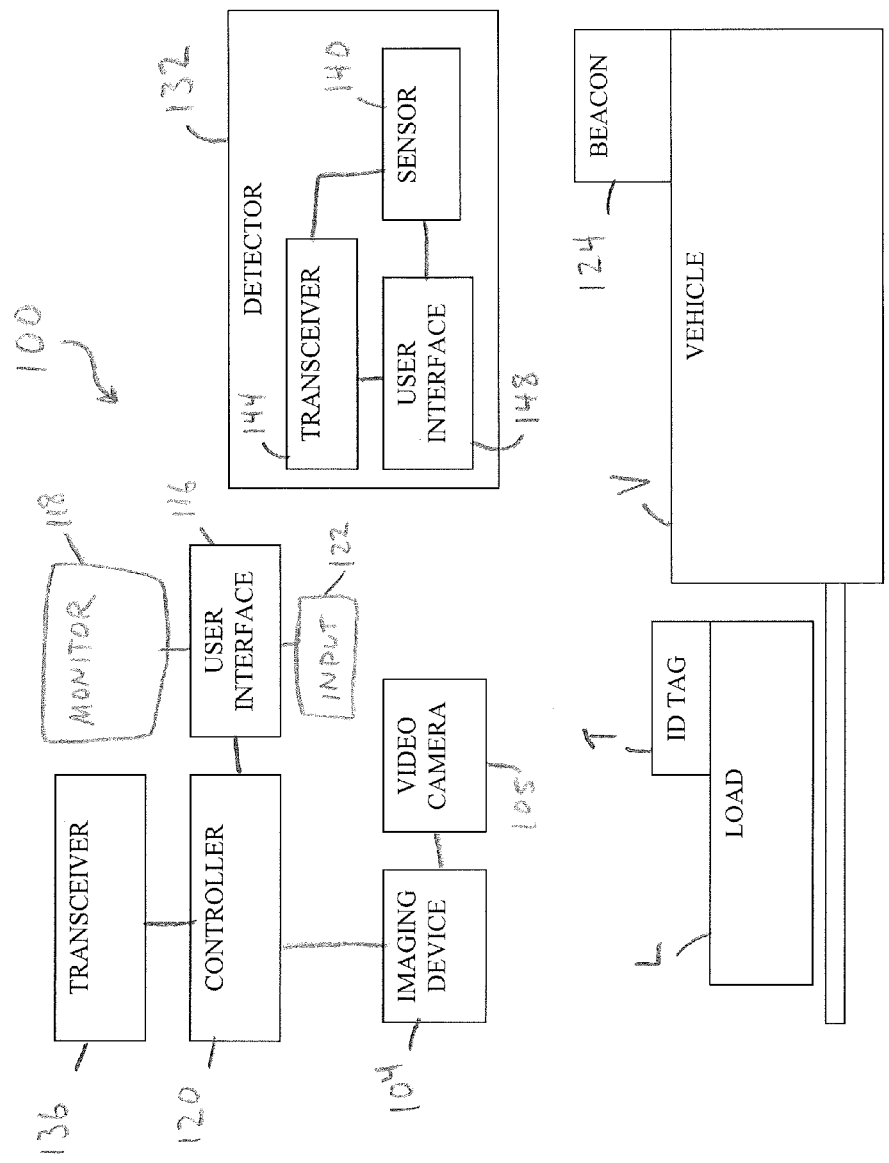
FIG. 1 depicts a block diagram of a system configured to determine the position of a vehicle provided with a beacon and to identify a load being carried by the vehicle.

For the purposes of promoting an understanding of the principles of the system described herein, reference is made to the embodiments illustrated in the drawings and described in the following written specification. It is understood that no limitation to the scope of the system is thereby intended. It is further understood that the system described herein includes any alterations and modifications to the illustrated embodiments and includes further applications of the principles of the system as would normally occur to one skilled in the art to which this system pertains.

As shown in FIG. 1, a vehicle tracking system 100 tracks the position of at least one vehicle V within a region R (FIG. 2) and identifies the load(s) L being transported by the vehicle V. As used in this document, the term "vehicle," refers to any apparatus or mobile device that moves a load L or assists in moving a load including, but not limited to, a forklift, a hand truck, an automated mover, and the like.

The portion of the system 100 configured to track the position of the vehicle V includes an imaging device 104, a user interface 116, a controller 120, and a beacon 124 connected to the vehicle. At least one beacons 124 is connected to the vehicle V. The beacon 124 emits an identifying signal that is unique or has unique characteristics as compared to the other beacons of the system 100. In the embodiment described herein, the beacon 124 emits light having a particular wavelength or emits light within a particular wavelength band that is detectable by the imaging device 104. For simplicity, the beacon 124 is described herein as emitting a particular "color" of light. In one embodiment, the beacon 124 includes an incandescent light bulb and a light filter, which only transmits light of the desired color.

Each beacon 124 is configured to emit light of a different color, with each color being distinguishable by the imaging device 104. For example, a system 100 configured to track the position of three vehicles V may include a beacon 124 configured to emit blue light connected to the first vehicle, a beacon configured to emit red light connected to the second vehicle, and a beacon configured to emit green light connected to the third vehicle. It is generally desirable for the beacons 124 to emit light in a color that is generally not emitted or reflected by other objects within the region R. It is contemplated that groups of vehicles V may have the same color of beacon 124 to enable the system 100 to track the groups. It is further contemplated that the beacon 124 may be modified to emit any type of unique identifying signal that is distinguishable by the imaging device 104. In one particular embodiment, the beacon 124 emits light having a wavelength that is invisible to the human eye, but that is visible to the imaging device 104. The beacon 124 may have a self-contained power supply, such as a battery, or the beacon may receive electrical power from the vehicle V.

With continued reference to FIG. 1, the imaging device 104 includes one or more video cameras 105 that generate image data. The digital image data may be transferred to the controller 120 by the camera 105 or by another element of the imaging device 104. The image data includes region data and beacon data. The region data is representative of the region R in the field of the view of the camera 105 and includes data related to the objects and structures positioned therein. Portions of the region data may be static, such as the position of distribution bay 212 (FIG. 2), whereas other portions of the regions data may be dynamic, such as the current position of a load L to be processed.

The beacon data is based on the identifying signals emitted by the beacons 124 located in the region R. The imaging device 104 includes one or more full-color video cameras to detect the wavelength(s) of light emitted each of the beacons 124. In general, the camera 105 is fixedly mounted in a position elevated above a floor of a facility, such that the camera has a fixed field of view of the region in which the vehicles V may be located. That is, the camera 105 does not pan, tilt, or zoom. In one particular embodiment, the camera 105 is an Internet Protocol imaging device that is configured to transmit data to the controller 120 via an Ethernet connection. Exemplary imaging devices of this type are presently manufactured by Axis® Communications; however, any other similar camera may be used.

To facilitate "viewing" of the beacons 124 by the camera 104, each beacon 124 is positioned atop a rod connected to the vehicle V to position the beacon above any object that may obstruct the view of the camera 105. Therefore, the beacons 124 are connected to the vehicles V in a manner that enables the camera 105 to have an unobstructed line of sight to each of the beacons within the region R.

Referring to FIG. 1, the user interface 116 includes a monitor 118 and an input device 122. In general, the monitor 118 may be one or more televisions and/or computer monitors. The input device 122 may be a keypad, keyboard, or any other such device, which may be used to input data to the controller 120. For example, the input device 122 may enable a user of the system 100 to identity which of the vehicles V and loads L within the field of view of the camera 105 the system 100 should track and/or identify.

The controller 120 is an electronic data processing device, which is configured to execute a software routine for processing data and generating an output suitable for display on the monitor 118. The controller 120 may be implemented with one or more general or specialized programmable processors that execute programmed instructions. The instructions and data required to perform the programmed functions may be stored in an electronic memory associated with the processors. The components of the controller 120 may be provided on a printed circuit card or provided as a circuit in an application specific integrated circuit ("ASIC"). Each of the circuits may be implemented with a separate processor or multiple circuits may be implemented on the same processor. Alternatively, the circuits may be implemented with discrete components or circuits provided in very large scale integration ("VLSI") circuits. Also, the circuits may be implemented with a combination of processors, ASICs, discrete components, or VLSI circuits. In one particular embodiment, the controller 120 is a personal computer.

As shown in FIG. 1 and as briefly described above, the system 100 detects the presence of a load L being transported by a vehicle V within the region R. The system 100 detects the presence of a load L with the detector 132 and sends a load identifying signal to a transceiver 136 connected to the controller 120. The term "load," as used in this document, refers to any device, element, structure, or combination thereof that is to be moved by a vehicle V. Each load L includes one or more machine readable identification tags T, which identify the load and its desired destination within the region R. Exemplary tags T include but are not limited to radio frequency identification tags ("RFID") and image identifiers such as one dimensional bar codes, two dimensional bar codes, quick response codes ("QR codes"), and the like.

The detector 132 includes a sensor 140 and a user interface 148 connected to another transceiver 144. In one embodiment, the detector 132 is a handheld unit that is positioned near a tag T by an operator of the vehicle V to manually scan the tag. In another embodiment, the detector is associated with the vehicle V and automatically scans the tag T of the load L being moved by the vehicle.

The sensor 140 is an RFID sensor configured to detect RFID tags T and/or an optical sensor configured to optically scan image identifiers. The sensor 140 detects the tag T when the tag is positioned near the sensor (or vice versa), and generates load identifying data in response to detecting the tag T. The load identifying data includes data related to the load L including the desired destination within the region R and a load identification, which may be used by the controller 120 to access additional load information from a load information database. Upon scanning the tag T, the detector 132 sends data to the controller 120, which associates the load L with the vehicle V that configured to move it.

The transceiver 144 of the detector 132 wirelessly transmits and receives data from the transceiver 136 wired to the controller 120. The transceivers 136, 144 may use any of the wireless data transmission protocols known to those of ordinary skill in the art. The transceiver 144 sends a load identifying signal, which includes the load identifying data (among other data), to the transceiver 136, which transmits the load identifying signal and data to the controller 120.

The user interface 148 of the detector 132 is a data display unit (not shown) and may include a data input unit (not shown). The data display unit is configured to display data received by the transceiver 144, the load identifying data, and other data in a user-readable format. In one particular embodiment, the user interface 148 is a liquid crystal display unit. The data input unit of the user interface 148 may be a keypad, keyboard, or any other data input device that may allow the operator to manually enter load data.

As shown in FIG. 2, operation of the system 100 is described with reference to a screenshot 200 of a region R, which represents a portion of an exemplary production facility 202. As shown in the screenshot 200, loads L enter the production facility 202 at the receiving areas 204, 208. An equipment operator (not shown) uses the vehicle V to move the loads L to the distribution bays 212, 216, 220. One or more cameras 105 of the imaging device 104 are positioned to monitor each receiving area 204, 208 and distribution bay 212, 216, 220.

The screenshot 200 represents a visual depiction of the image data generated by one of the cameras 105 of the imaging device 104 (as well as other data) as may be seen on the monitor 118 by a user of the system 100. The controller 120 processes the image data and other data to generate numerous screenshots per second so that a "real-time" view of the production facility 202 is achieved.

The system 100 overlays one or more virtual zones 224 onto the screenshot 200. The input device 122 of the user interface 116 enables a user to adjust the size, shape, and position of the virtual zones 224, which may have any closed shape. After the virtual zones 224 are adjusted, zone data is sent to the controller 120, which represents the identifying characteristics of each virtual zone within the region R. As shown in FIG. 2, the virtual zones 224 are positioned to encompass the receiving areas 204, 208 and the distribution bays 212, 216, 220. The virtual zones 224 are visible on the monitor 118, but are not visible upon the floor of the production facility 202.

The controller 120 implements a software routine, which enables the system 100 to detect the position of each beacon 124 within the region R (i.e. within the screenshot 200). To this end, the controller 120 may utilize open source computer vision software such as the Aforge.Net software suite developed by Andrew Kirillov and licensed under the GNU Lesser General Public License including the Aforge.Net programs referred to as AForge RGB Filter and AForge Blob.

To detect the position of the vehicle V and its associated load L, the system 100 processes the image data generated by the imaging device 104 to at least partially isolate the beacon data from the region data. In particular, the controller 120 processes the image data with AForge RGB Filter or another similar image-processing program. The controller 120 processes the image data in search of the color or wavelength of light radiated by each of the beacons 124, which the user desires to track. For example, the beacon 124 in FIG. 2 emits red light, thus the controller 120 processes the screenshot 200 to eliminate the image data that does not correspond to red light. The portion of the image data that the controller 120 determines is related to the beacon is isolated in a data set referred to as the isolated beacon data.

The controller 120 repeats this process to generate isolated beacon data, as shown graphically in FIG. 3, for each beacon 124 within the screenshot. The modified screenshot 226 includes the isolated beacon for a beacon 124 emitting red light, and includes data corresponding to the beacon and data corresponding to artifacts 228. The artifacts 228 represent image data that is not associated with the beacon 124, but that are associated with objects in the production facility 202 that emit or reflect light in the same color as the beacon. The user interface 116 generally does not display the modified screenshot 226; instead, the screenshot 226 is representative of the processing steps performed by the controller 120.

Next, the controller 120 processes the isolated beacon data with AForge Blob or another similar image-processing program. The AForge Blob program searches the isolated beacon data in search of portions of data, which correspond to a beacon 124. As shown in FIG. 3, the beacon 124 corresponds to generally circular region of data, whereas the artifacts 228 encompass a larger area and have an elongated shape. The AForge Blob program searches the isolated beacon data and discriminates against the data corresponding to the artifacts and retains the data corresponding to the beacons 124. Any element of the production facility 202 that regularly produces an artifact having a similar profile as one of the beacons 124 should be eliminated to avoid generating false positive beacon identifications. Additionally or alternatively, the AForge Blob program may be configured such that the program ignores the image data associated with area(s) of the production facility 202 that regularly produce artifacts.

Next, the controller 120 processes the isolated beacon data to generate position data, which represents the position of each beacon 124 in the region R. The position data includes a coordinate position of each beacon 124. Generally, a horizontal coordinate and a vertical coordinate are used to identify the position of each beacon 124; however, the controller 120 may utilize other coordinate systems.

Thereafter, the controller 120 processes the isolated beacon data to generate identification data, which represents the particular beacon 124 that has been detected. Specifically, the controller 120 processes the isolated beacon data to determine which "colors" of beacons are present in the data. The identification data is generally a single variable of data for each detected beacon 124; however, other data systems may be utilized.

If the controller 120 has received one or more load identifying signals, the controller generates load position data by associating each load L with the position of a corresponding beacon 124. As described above, upon scanning a load L with the detector 132 it is associated with a particular one of the vehicles V. Using the identification data and the position data the controller associates each load L with a corresponding beacon position. Thus, by determining the position of the beacons 124, the system 100 has determined the position of each detected load L being carried by a vehicle V within the region R.

Next, the controller 120 processes the position data and the zone data to generate active zone data, which includes data related to each zone in which a beacon 124 is positioned. Each zone of the zone data encompasses an area of positions of the region R. The controller 120 compares the position of each beacon 124 to the positions encompassed by the zones. If the position data indicates that a beacon 124 is positioned within a zone, the controller 120 flags the zone as an "active" zone and updates the active zone data to include the active zone. This process is repeated for the position of each beacon 124.

Next, as shown in the screenshot 232 of FIG. 4, the controller 120 outputs the image data, the position data, the identification data, the zone data, and the active zone data to the monitor 118. The image data appears on the monitor 118 as a video of the region R. The position data is shown on the monitor 118 by the position marker 236, which is positioned over the beacon. The position data may also be shown by the vertical marker 238 and the horizontal marker 240 which extend through the position marker 236. The identification data is shown by color of the position marker and the markers 238, 240, if present. For example, if the beacon 124 represented by the position marker 236 emits red light, the position marker and the markers 238, 240 may have a red color on the monitor.

The zone data appears on the monitor as an outlined portion of the region R as shown by the inactive zones 224 and the active zone 225. The outlined portion of the active zone 225 has different appearance than the inactive zones 224 to highlight to a viewer that a beacon 124 is present in the zone 225. In particular, the outlined portion of the zone 225 may be more brightly illuminated and/or illuminated in the color of the light radiated by the beacon 124 positioned therein.

The controller 120 periodically updates the user interface 116 to show the real time position of each beacon 124 positioned within the field of view of the camera 105. Accordingly, the controller 120 may track and store in an electronic memory the position of one of the beacons 124 from one screenshot to the next to enable the controller to develop a vector representing a direction and a speed of movement of the vehicle V. The vector enables the controller 120 to project the path to be taken by the vehicle V and to alert a viewer of the user interface 116 if the projected path is undesirable.

The system 100 also operates to determine if the equipment operator of the vehicle V has moved the load L to a desired destination, such as one of the distribution bay 212, 216, 220. As described above, the load L may have assigned to it a particular destination within the region R, such as to one of the distribution bays 212, 216, 220. This assigned distribution bay may be included in the load data received by the controller 120. The controller 120 associates the desired distribution bay with a desired virtual zone using a look-up table or any other method of association. Alternatively, the controller is supplied with data indicative of the desired virtual zone of each load L. As shown in FIG. 4, each of the distribution bays has a virtual zone positioned around it.

Thereafter, the controller 120 continues to process the image data to determine if any of the loads are positioned in their desired zone or in another one of the undesired zones. The controller 120 generates matching virtual zone data when a load L is positioned in its desired zone. The controller 120 outputs the matching virtual zone data to the monitor 118, where it appears different than the other zones, which do not contain a load in its desired zone. Additionally, before a load L reaches its desired zone, the controller 120 may cause the monitor 118 to identify the desired distribution bay. For example, the controller 120 may determine that the load L being carried by the vehicle of FIG. 4 should be moved to distribution bay 212. If the equipment operator moves the vehicle V to the distribution bay 212 such that the beacon 124 enters the virtual zone 224 associated with the bay 212, then the controller 120 determines that the load was moved to the correct bay. If, however, the equipment operator moves the load L (and the vehicle V) to any other distribution bay 216, 220 or does not move the load to the distribution bay 212 within a predetermined time period, then the controller 120 may alert the viewer of the user interface 116. The controller 120 may produce a visible indicator on the monitor 118 or emit a sound when the load L is moved to a location other than the desired location.

FIG. 5 depicts another embodiment of a system 102' configured to track the position of a vehicle V and to identify a load L being transported by the vehicle. The system 102' works identically to the system 100 of FIG. 1, except for the following differences. The imaging device 104' includes a camera 105' and a transceiver 152' to enable the imaging device 104' to transmit the image data wirelessly to the transceiver 112'. Thus, the imaging device 104' may simplify the installation of the system 102' by eliminating the wired Ethernet connection between the imaging device 104 and the controller 120 of the system 100 of FIG. 1. Additionally, the imaging device 104' may be configured to pan, tilt, and/or zoom. Accordingly, the system 102' may highlight the position of a detected vehicle V without displaying one or more zones 224, which would become misaligned due to the movement of the camera. Another difference is that the detector 132' is not a portable handheld unit. Instead, the detector 132' is connected to the vehicle V and is positioned to detect the tag T on the load L when the vehicle V becomes associated with the load, thereby eliminating the need for the equipment operator to manually scan the tag T.

While the system 100 has been illustrated and described in detail in the drawings and foregoing description, the same should be considered as illustrative and not restrictive in character. It is understood that only the preferred embodiments have been presented and that all changes, modifications, and further applications that come within the spirit of the system described herein are desired to be protected.

What is claimed is:

1. A vehicle tracking system for tracking a position of at least one vehicle and outputting the position to a monitor, the vehicle tracking system comprising:
    a plurality of beacons, each of said beacons configured to emit a corresponding identifying signal and at least one of said beacons provided on each of the vehicles;
    a camera configured to generate digital image data including (i) region data representative of a region in which the vehicles may be located and (ii) beacon data based on said identifying signals corresponding to said beacons located in said region; and
    a controller including virtual zone data based on a plurality of virtual zones in a field of view of said camera, said controller configured
        (i) to process said beacon data to generate position data representative of a corresponding position of said beacons located in said region,
        (ii) to process said beacon data to generate identification data corresponding to each of said identifying signals emitted by said beacons located in said region,
        (iii) to generate active zone data in response to said position data indicating that at least one of the beacons is positioned in a virtual zone, and
        (iv) to output said image data and said active zone data, and at least one of said position data and said identification data to the monitor.

2. The vehicle tracking system of claim 1, wherein:
    said controller is further configured to output said virtual zone data to said monitor, and
    virtual zones corresponding to said active zone data are displayed on the monitor differently than virtual zones that do not correspond to said active zone data.

3. The vehicle tracking system of claim 1, wherein each of said beacons emits an identifying signal of a different wavelength of light.

4. The vehicle tracking system of claim 3, wherein each of said beacons emits an identifying signal of visible light.

5. The vehicle tracking system of claim 1, wherein said camera is a video camera that is fixedly positioned relative to said region.

6. The vehicle tracking system of claim 5, wherein said video camera is positioned to have an unobstructed line of sight to each of said beacons located in said region.

7. The vehicle tracking system of claim 1, wherein the controller is further configured to discriminate against artifact beacon data when processing said beacon data.

8. The vehicle tracking system of claim 1, wherein said active zone data is output on said monitor as a closed shape encompassing a portion of the field of view of the camera.

9. A vehicle tracking system for tracking a plurality of vehicles within a region, each of the vehicles being associated with a corresponding load, the vehicle tracking system comprising:
- a plurality of beacons, each of said beacons configured to emit a corresponding identifying signal and at least one of said beacons provided on each of the vehicles;
- a plurality of detectors, each of said detectors provided on a corresponding one of the vehicles, and each of said detectors configured to detect the load associated with the vehicle and to emit a corresponding load identifying signal based on the load;
- a camera configured to generate image data of a portion of the region within a field of view of the camera and beacon position data representative of a corresponding position of said beacons located in said portion of the region; and
- a controller including virtual zone data based on a plurality of virtual zones in the field of view of said camera and desired virtual zone data identifying a corresponding desired virtual zone of each load, said controller configured
  (i) to receive said load identifying signals,
  (ii) to generate load position data by associating each of said load identifying signals with said beacon position data,
  (iii) to generate mismatched virtual zone data in response to said load position data indicating that at least one of the loads is positioned in a virtual zone other than said corresponding desired virtual zone, and
  (iv) to output said image data and said mismatched virtual zone data to a monitor,
  wherein said mismatched virtual zone data is shown as a visual indicator on said monitor.

10. The vehicle tracking system of claim 9, wherein said controller is further configured:
- to generate matching virtual zone data in response to said load position data indicating that at least one of the loads is positioned in said corresponding desired virtual zone; and
- to output said matched virtual zone data to said monitor with said matching virtual zone data shown differently on said monitor than said mismatched virtual zone data.

11. The vehicle tracking system of claim 9, wherein:
each of the loads includes an identification tag,
said detector detects load information from said identification tag, and
said detector generates said load identifying signal based on said detected load information.

12. The vehicle tracking system of claim 11, wherein said identification tag is a radio frequency identification tag.

13. The vehicle tracking system of claim 11, wherein:
said identification tag is a visual identifier, and
said detector optically scans said visual identifier to detect said load information.

14. The vehicle tracking system of claim 13, wherein said visual identifier is one of a quick response code, a one dimensional bar code, and a two dimensional bar code.

15. The vehicle tracking system of claim 10, wherein:
said matched virtual zone data are displayed on the monitor in a first color, and
said mismatched virtual zone data are displayed on the monitor in a second color.

* * * * *